J. M. HOWE.
PACKLESS JOINT.
APPLICATION FILED SEPT. 1, 1917.

1,354,192.

Patented Sept. 28, 1920.

INVENTOR
James M. Howe.
By Fay, Oberlin & Fay
ATTORNEYS.

UNITED STATES PATENT OFFICE.

JAMES M. HOWE, OF CLEVELAND, OHIO, ASSIGNOR TO GRANT MOTOR CAR CORPORATION, OF CLEVELAND, OHIO, A CORPORATION OF VIRGINIA.

PACKLESS JOINT.

1,354,192.   Specification of Letters Patent.   Patented Sept. 28, 1920.

Application filed September 1, 1917. Serial No. 189,239.

*To all whom it may concern:*

Be it known that I, JAMES M. HOWE, a citizen of the United States, and a resident of Cleveland, county of Cuyahoga, and State of Ohio, have invented a new and useful Improvement in Packless Joints, of which the following is a specification, the principle of the invention being herein explained and the best mode in which I have contemplated applying that principle, so as to distinguish it from other inventions.

The present invention, which relates generally, as indicated, to a packless joint, is particularly concerned with the provision of a seal between a rotating shaft and the wall or member through which the shaft extends, and is intended to prevent the leakage of lubricant from one side of the wall or casing along the shaft to the outside. It is difficult to prevent the leakage of lubricant through a casing along a shaft without the use of packing, for which special provision must be made in the casing, and which must be renewed at frequent intervals, and the present invention is intended as a simple and permanent means for effecting a seal between a casing and the rotating shaft. The invention can obviously be used in connection with any two concentric parts having relative rotative movement. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
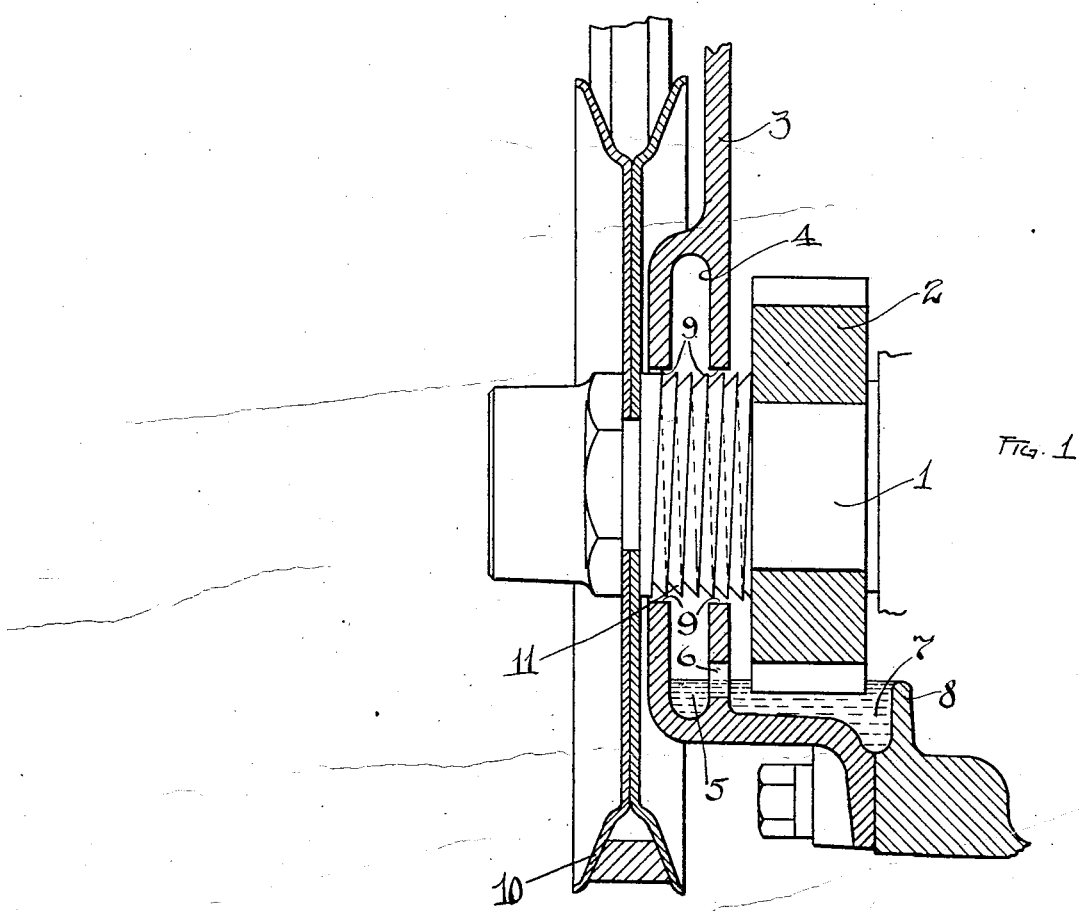
Figure 2:
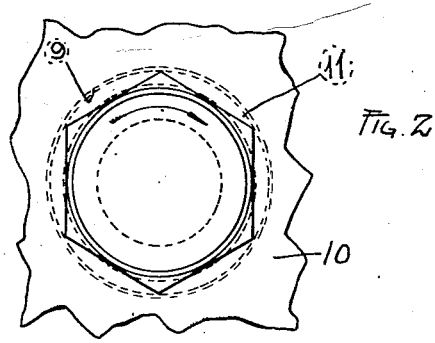

Figure 1 is a longitudinal section, partly in elevation, illustrating my improved device embodied in a shaft which operates within an aperture in a wall; and Fig. 2 is a front end view of the same.

Obviously the present invention is not limited to any particular use as it is applicable quite generally to all rotating parts operating within other parts, whether the latter be walls or casings, or are themselves rotating either in the same or opposite directions from the first-named member. For clearer illustration I have shown the device in connection with a crank shaft 1, intended for use in an internal combustion motor, this shaft driving by means of a gear 2 thereon, a secondary shaft (not shown) of a motor. The shaft 1 is of course mounted in suitable bearings, which it is not thought necessary to illustrate, and extends through the wall 3 of the casing, which is intended to inclose the shaft 1, the gear 2 and any other mechanism associated therewith, and which is provided with a pocket or recess 4, extending about the shaft and forming at its lower portion an oil reservoir 5, which is connected by means of an aperture 6 with the main reservoir 7, into which the gear 2 dips for lubrication. The reservoir 7 is maintained at a constant level by means of the transverse partition 8, over which the oil flows when in excess to the lower part of the casing, where there will preferably be a main oil reservoir, which is not shown in the present drawing.

The shaft 1 extends through the aperture 9 formed in the wall 3 of the casing and bears, externally of such casing, a pulley 10 for driving other mechanism, and it is desirable to prevent the movement of lubricant from within the casing along the shaft to the outside where it would foul the pulley 10, the belt which will ordinarily be used thereon, and also the exterior of the motor and any parts which are exposed thereon.

It will be understood that the shaft 1 is rotated at variable speeds, but ordinarily at a relatively high speed, such for example, under the normal operation of the vehicle, at, say, 1200 revolutions or more per minute. At this speed, the gear 2 throws up a large quantity of oil from the reservoir 7, much of which is in the form of mist which collects on the walls of the casing 3 and eventually drips down on to the shaft and, in the ordinary construction, works its way along the shaft to the outside of the casing. I have found that by forming on the shaft 1, or by mounting thereon in a separate member, a buttress threading 11, the oil which drips onto this part of the shaft from the wall 3 is conveyed rearwardly on the shaft into the casing 3 and prevented from working its way along the shaft to the outside. The threading must run about the shaft in the same direction as the rotation of the shaft leading toward the observer, that is, if the shaft is rotating in a clockwise direction, looking at the shaft from the left of Fig. 1, the threading must be left-hand threading (see Fig. 2). I have found that a certain clearance may be allowed between the walls of the aperture 9 and the threading 11.

In operation the oil drops upon the inner end of the threading and in some cases also collects upon the threading which is beneath the recess 4 and is then actuated to the right along the shaft 1, the action being that of a screw conveyer. As the speed of the oil along the threading is increased, and as the oil collects in greater amounts, drops will be thrown off having the direction of a helix starting from the point of separation from the threading. Any of these drops which are thrown off within the casing 3 deposit of course upon the walls of the same and drain back into the reservoir 7, while the oil which is thrown off from the forward part of the threading deposits upon the walls of the recess 4 and drains back into the reservoir 5.

The present device has been found extremely effective in preventing any leakage of lubricant along a shaft and it is extremely simple and inexpensive to construct and mount upon a shaft, not only because of the coarse threading which may be used, but also because of the clearance which may be allowed between the threading and the aperture in the casing so that accurate work is not required either in dimensioning the aperture or in forming the threading.

Other modes of applying the principle of my invention may be employed instead of the one explained, change being made as regards the mechanism herein disclosed, provided the means stated by the following claims or the equivalent of such stated means be employed.

I therefore particularly point out and distinctly claim as my invention:—

1. In a device of the character described, the combination of a casing having a casing wall having a pocket therein, and an aperture therethrough, the inner wall of the pocket having an aperture communicating with the interior of the casing, a shaft extending through the apertures in said casing wall, buttress threading formed on said shaft beneath and adjacent to said casing wall and pocket, said threading being formed with clearance within the walls of such aperture and being adapted to actuate lubricant therein away from the outer wall of said casing, such pocket being adapted to collect such lubricant whereby said lubricant will flow back into said casing through such communicating aperture.

2. In a device of the character described, the combination of a casing having an end wall provided with an opening, a shaft extending through such opening, buttress threading formed on said wall or said shaft, said threading being formed to leave clearance between it and the adjacent wall or shaft element and said threading being formed to actuate lubricant therein away from the outer side of said casing upon rotation of said shaft, and said casing being provided with a pocket adjacent said wall, said pocket being adapted to receive lubricant and return the same to the interior of said casing.

3. In a device of the character described, the combination of a casing and a shaft, said casing having an end wall and a spaced interior wall provided with alined openings and said shaft extending therethrough, buttress threading interposed between said shaft and said casing walls and fixed to one of such elements, said threading having clearance between such elements and being adapted to actuate lubricant therein away from the outer walls of said casing and into the pocket formed between said end and interior walls of said casing, and said interior wall having a passage therein adapted to convey such lubricant into the interior of said casing.

Signed by me, this 10th day of August, 1917.

JAMES M. HOWE.